United States Patent [19]

Jones et al.

[11] 4,012,071

[45] Mar. 15, 1977

[54] CAB MOUNTING DEVICE

[75] Inventors: Gary E. Jones, Aurora; Dean H. Hart, Yorkville; Rueben R. Brunka, Aurora, all of Ill.

[73] Assignee: Caterpillar Tractor Co., Peoria, Ill.

[22] Filed: Aug. 4, 1975

[21] Appl. No.: 601,282

[52] U.S. Cl. .............................. 296/35 R; 248/21
[51] Int. Cl.² ...................................... B62D 23/00
[58] Field of Search ............ 296/35 R; 248/21, 22, 248/15, 18

[56] References Cited
UNITED STATES PATENTS

| | | | |
|---|---|---|---|
| 2,132,840 | 10/1938 | Workman | 296/35 R |
| 2,912,057 | 11/1959 | Wagner | 180/68 |
| 3,479,081 | 11/1969 | Schaaf | 296/35 R |
| 3,508,784 | 4/1970 | Small | 296/35 |
| 3,572,819 | 3/1971 | Moore | 296/102 |
| 3,831,704 | 8/1974 | Zuege | 296/35 R |

*Primary Examiner*—Philip Goodman
*Assistant Examiner*—John A. Carroll
*Attorney, Agent, or Firm*—Phillips, Moore, Weissenberger, Lempio & Majestic

[57] ABSTRACT

A shock absorbing cab mounting device for a vehicle is disclosed, comprised of a flange member fixed to the vehicle frame and an elastomeric vibration absorbing device, the flange member having a projection extending upwardly and inwardly with an axial bore centrally located in the top portion. The projection is bondingly surrounded by an elastomeric member which has embedded therein and interior of the projection a fastening nut, the fastening nut axially aligned with a bore in the elastomeric member and of greater outside diameter than the bore in the top portion of the projection. A fastening means disposed through a mounting hole in the cab and threadably engaging the fastening nut serves to affix the cab to the mounting device while pre-stressing by compression the elastomeric member to lessen shear forces imposed thereon by the transmission of vibrations from the vehicle frame thereby prolonging the life of the mounting device.

6 Claims, 3 Drawing Figures

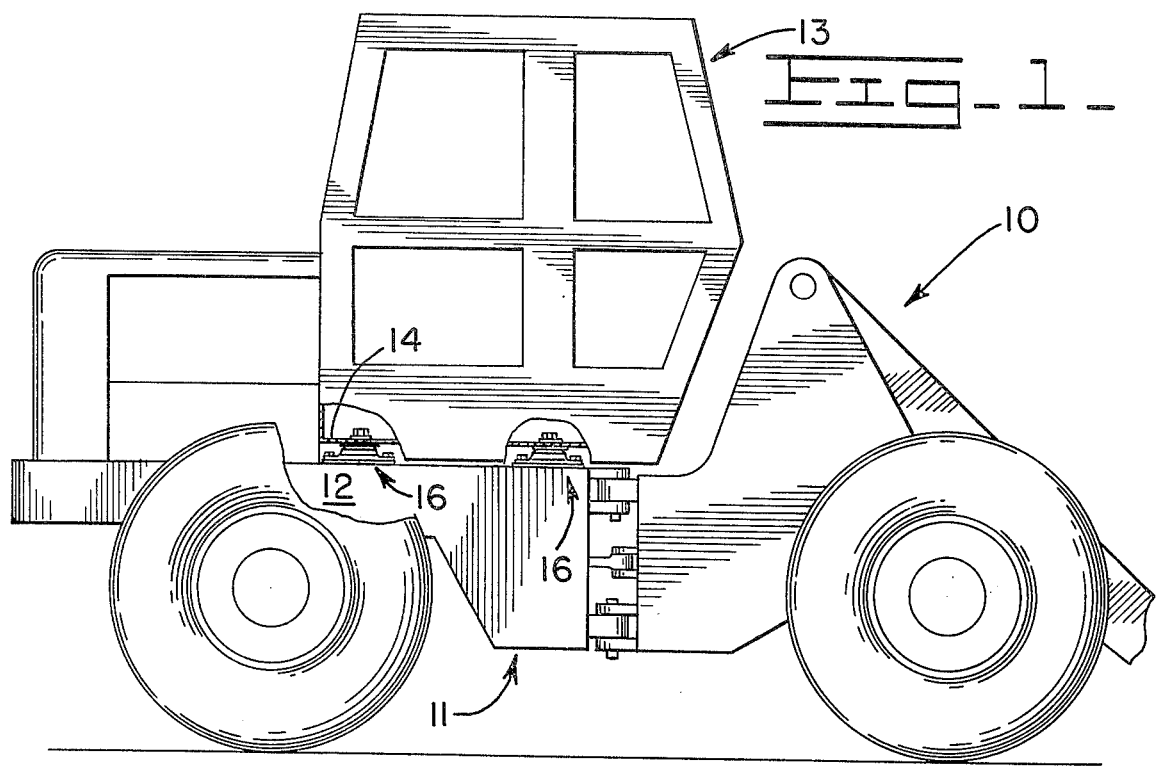
Fig. 1.
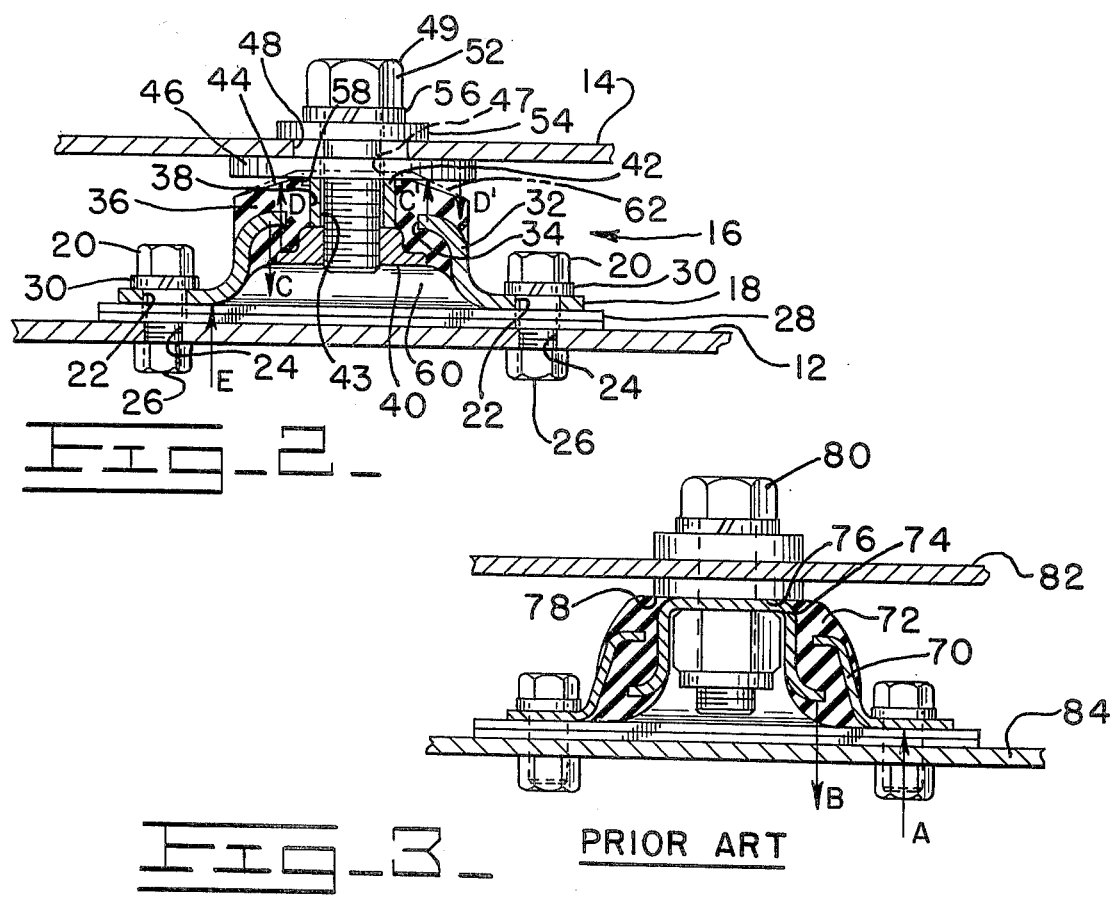
Fig. 2.
Fig. 3. PRIOR ART

CAB MOUNTING DEVICE

BACKGROUND OF THE INVENTION

Mounting of cabs on earthworking vehicles requires the use of some shock absorbing device to eliminate transmission of vibrations imposed on a vehicle frame to the cab. Such vibrations, if not dampened, impose a degree of discomfort on the operator and, additionally, vibrate instrument panels mounted in the cab making it extremely difficult for the operator to properly monitor engine and vehicle operation. Accordingly, various devices have been developed to dampen such vibrations. In general, such devices have incorporated an elastomeric member bonded to a flange or mounting device bolted to the vehicle frame. Partially embedded in the elastomeric member is a second metallic device, the second metallic device usually making metal-to-metal contact with the cab. An attachment bolt, disposed through a mounting hole in the cab floor and through the second metallic device embedded in the elastomeric shock absorbing device, with an attachment nut threadably engaged thereon, serves to attach the cab to the shock absorbing device, while placing the shock absorbing device under constant tension because of cab weight. In this conventional type of cab mounting device, it has been found that static tension forces coupled with shear forces within the unstressed elastomeric members caused by vehicle vibration results in early failure of the elastomeric members and consequently requires replacement of the mounting device before the vehicle may be safely operated.

SUMMARY OF THE INVENTION

It is accordingly an object of this invention to provide a longer lived mounting device to affix a cab to a vehicle frame in which an elastomeric member dampens vibrations transmitted to the cab from the vehicle frame, thus extending the fatigue life of the cab structure.

It is a further object of this invention to reduce transmission of sounds from the vehicle frame to the vehicle cab.

It is a still further object of this invention to provide a cab mounting device, which fulfills the above object, wherein the elastomeric member is pre-stressed in compression to lessen shear forces in the elastomeric shock absorbing member.

It is also an object of this invention to provide a cushioning member which lessens the amplitude of vibrations transmitted to the cab.

It is still a further object of this invention to provide a cab mounting device which, while fulfilling the above objects, has embedded in the elastomeric shock absorbing member an attachment nut for threadably receiving the attachment bolt affixing the cab to the mounting device.

It is still a further object of this invention to provide a cab mounting device which while fulfilling the above objects, is easily installed requiring no special tools.

Broadly stated, the invention is a mounting means for limiting transmission of vibrations imposed on a first member to a second member. The mounting means comprising a mounting flange mounted relative to the first member and having a tube-like projection extending upwardly and inwardly of the first member, the tube-like projection having a top portion defining a bore generally coincident with the longitudinal axis of the tube-like projection. An elastomeric cushioning member is bonded to and substantially surrounds the top-portion of the projection, extending downwardly of the tube-like projection, and defines an axial bore substantially aligned with the longitudinal axis of the axial bore located in the top portion. A fastening nut is bondingly associated with the elastomeric cushioning member interior of the tube-like projection. A tubular bushing means is contained in the axial bore of the elastomeric cushioning member engaging the fastening nut at one end and extending upwardly in the axial bore of the elastomeric cushioning member a predetermined distance less than the depth of the axial bore. Fastening means, threadably engaging the fastening nut are disposed through the tubular bushing, urges the second member towards the first member when the second member is engaged with the elastomeric cushioning member so that the cushioning member is compressed between the second member and the fastening nut an amount determined by the length of the tubular bushing means.

BRIEF DESCRIPTION OF THE DRAWINGS

These and other objects of the invention will become apparent from a study of the following specifications and drawings, in which:

FIG. 1 illustrates a wheeled vehicle having mounted thereon a cab utilizing mounting devices which are the subject of this invention;

FIG. 2 is a detailed cross-section of the mounting device shown in FIG. 1;

FIG. 3 illustrates a well-known mounting device currently used to mount cabs to vehicle frames;

DETAILED DESCRIPTION OF THE PREFERRED EMBODIMENT

Referring to FIG. 1, a wheeled vehicle 10 is shown having a frame 11 comprised of a first member 12, on which a cab 13, comprised of a second member 14, is mounted by a plurality of mounting means 16. It is to be understood that wheeled vehicle 10 is representative only, such mounting means 16 being equally useful on any vehicle in which vibrations imposed on a first member 12 could be transmitted to a second member 14.

Referring to FIG. 2, a mounting flange 18 is affixed to first member 12 by a plurality of bolts 20 disposed through bolt holes 22 defined in mounting flange 18 and further disposed through mounting holes 24 in first member 12. Bolts 20 have threadably engaged thereon nuts 26. Interposed between mounting flange 18 and first member 12 are spacer plates 28 which may or may not be necessary to properly position mounting flange 18 at a predetermined distance above first member 12. Lock washer 30 may similarly be disposed between the head of bolt 20 and mounting flange 18.

Mounting flange 18 has extending upwardly and inwardly therefrom a tube-like projection 32, forming a bore 34 axially located in the top portion thereof. An elastomeric cushioning member 36 is bonded to and surrounds the top portion of projection 32 and extends downwardly therefrom, the elastomeric cushioning member defining an axial bore 38 substantially aligned with bore 34 in the top portion of tube-like projection 32 and of lesser dimension. Bondingly disposed in elastomeric cushioning member 36 and interior of tube-like projection 32 is fastening nut 40. Fastening nut 40 has a greater exterior diameter than bore 34 of tube-like projection 32 to prevent fastening nut 40 from being pulled through bore 34 when a fastening bolt is engaged therewith. Contained in axial bore 38 is tubular bushing means 42 engaging fastening nut 40 at one end and extending upwardly in bore 38 a predetermined distance less than the depth of bore 38. Bushing means 42 enables a fastening bolt 49 to be properly torqued without exceeding the proper pre-stress on the elastomeric cushioning member 26. Positioned above elastomeric cushioning member 36 may be a washer 46 having a outer diameter substantially equal to elastomeric cushioning member 36, and defining a bore 47 substantially equal to that of bore 43 of tubular bushing means 42. Upper surface 44 of elastomeric cushioning member 36 may be frustoconic in shape so that compression of elastomeric cushioning member 36 will cause an increased contact area with washer 46. Engaged in fastening nut 40 and disposed through bore 43 of tubular bushing means 42, bore 47 of washer 46 and through mounting hole 48 in second member 14 is a fastening means such as fastening bolt 49. Interposed between second member 14 and head 52 of fastening bolt 49 may be a washer 54 of sufficiently large diameter to prevent head 52 from passing through mounting hole 48. A lock washer 56 may similarly be disposed between washer 54 and head 52 to inhibit rotation of fastening bolt 49. An annular cavity 58 may be provided at the upper end of bore 38 of elastomeric cushioning member 36 to provide for expansion of top surface 44 when elastomeric cushioning member 36 is placed under compression. A cavity 60 is formed by tube-like projection 32, elastomeric cushioning member 36 and fastening nut 40 to allow elastomeric cushioning member 36 movement in the vertical direction without contacting plates 28.

In operation, mounting flange 18 is affixed to a first member 12 of frame 11 by bolts 20. Similarly, second member 14 of cab 13 is affixed to elastomeric cushioning member 36 by fastening bolt 49 threadably engaged in fastening nut 40. Fastening bolt 49 is advanced sufficiently in fastening nut 40 to compress cushioning member 36 between second member 14 and fastening nut 40 and cause washer 46 to contact tubular bushing means 42 contained in axial bore 38 of elastomeric cushioning member 36. As shown in FIG. 2, upper surface 44 in the uncompressed condition is defined by dotted line 62. By pre-stressing cylindrical cushioning member 36, vibration forces imposed on first member 12 resulting in shear forces imposed on cushioning member 36 are largely absorbed by the pre-stressed compression of elastomeric cushioning member 36.

Referring to FIG. 3, which is representative of the well known cushioning members used in affixing vehicle cabs to vehicle frames, a flange 70 is encompassed by an elastomeric member 72 having embedded therein a cup shaped member 74. Upper surface 76 of cup shaped member 74 lies in the same plane as upper surface 78 of elastomeric member 72; thus, with mounting bolt 80 affixing vehicle cab 82 to cup shaped member 74, forces imposed on the vehicle frame 84 are transmitted directly through flange 70 to elastomeric member 72 to be absorbed in their entirety with no pre-stressed compressive force to dampen shear forces. For example, if a transient vertical vibratory force represented by vector A in FIG. 3 is imposed on flange 70, a reaction inertia force represented by vector B is created by cup shaped member 74 causing a shearing force between cup member 74 and flange 70. Referring to FIG. 2, by compressing elastomeric member 36 at installation, a compressive force represented by vector C extending downwardly from tube-like projection 32 and vector D extending upwardly from attachment nut 40 is created within elastomeric cushioning member 36. Similar forces C' and D' are also created between second member 14 and tube-like projection 32. Thus, when a vertical vibratory transient force represented by vector E is imposed on flange member 18, the compressive forces represented by vectors C and D must be overcome, returned to zero and in fact, become tensile forces before a potentially destructive shearing force is imposed on elastomeric cushioning member 36. A similar analysis is evident for lateral forces operating on flange member 18 transmitted from first member 12. Resiliency of elastomeric cushioning member 36 when installed, as shown in FIG. 2 is determined by the composition of elastomeric cushioning member 36 in conjunction with the length of tubular bushing means 42. Assembly of the cab 13 to the frame 11 is simplified by use of the tubular bushing means 42 limiting the compression of cushioning member 36 on assembly to a predetermined amount.

What is claimed is:

1. Mounting means for limiting transmission of vibration imposed on a first member to a second member, the mounting means comprising:

a mounting flange mounted relative to the first member, said mounting flange having a tube-like projection extending generally upwardly of said first member and a top portion extending inwardly of said tube-like projection said top portion defining a bore generally coincident with the longitudinal axis of the tube-like projection;

an elastomeric cushioning member substantially surrounding said top portion and extending downwardly of said tube-like projection, said elastomeric cushioning member bonded to said top portion and said tube-like projection and defining an axial bore substantially aligned with the longitudinal axis of the axial bore located in said top portion;

a fastening nut bondingly associated with the elastomeric cushioning member interior of the tube-like projection;

tubular bushing means contained in the axial bore of the elastomeric cushioning member engaging the fastening nut at one end and extending upwardly therefrom in said axial bore of the elastomeric cushioning member a predetermined distance less than the depth of said axial bore of the elastomeric cushioning member, and;

fastening means threadably engaging said fastening nut and disposed through said tubular bushing means for urging said second member toward said first member when said second member is engaged with said elastomeric cushioning member so that said elastomeric cushioning member is compressed between said second member and said fastening nut an amount determined by the length of the tubular bushing means without deformation of the tubular bushing means.

2. The apparatus as set forth in claim 1 wherein the fastening nut bondingly associated with the elastomeric cushioning member further comprises a fastening nut having a diametrical dimension greater than the bore defined in the top portion of the tube-like projection.

3. The apparatus as set forth in claim 2 and further comprising a vehicle frame and an operator's cap, the vehicle frame comprising said first member, the operator's cab comprising said second member, said second member defining a mounting hole for receiving the fastening means, and further wherein the fastening means comprises:
- a first washer having an outside dimension substantially equal to the elastomeric cushioning member;
- a second washer; and,
- a fastening bolt having a threaded shank and a head, the threaded shank of sufficient length to extend through the elastomeric cushioning member while threadably engaged with the fastening nut and further to extend through the first and second washers in the mounting hole in the cab, the first washer interposed between the elastomeric cushioning member and the cab, the second washer interposed between the cab and the head of the fastening bolt, so that turning the fastening bolt while threadably engaged in the fastening nut to advance the bolt therein, while the bolt is disposed through the second washer, the cab mounting bolt, first washer, and the tubular bushing means compresses the elastomeric cushioning means.

4. The apparatus as set forth in claim 3 wherein the first member defines mounting holes and wherein the mounting flange further comprises a mounting flange defining a plurality of bolt holes; further comprising attachment means for fixing the mounting flange relative the first member, the attachment means comprising a plurality of bolts each disposed through a bolt hole of the mounting flange and a corresponding mounting hole defined in the first member, and a plurality of nuts threadably engagable on said bolts to securely fix said mounting flange to said first member.

5. The apparatus as set forth in claim 4 wherein the elastomeric cushioning member further comprises a cylindrical elastomeric cushioning member having a frustoconical top portion extending upwardly of the top portion of the mounting flange.

6. The cab mounting means as set forth in claim 5 wherein the fastening means further comprise a lock washer disposed on the fastening bolt between the bolt head and the second washer.

* * * * *